Patented Feb. 13, 1934

1,947,414

UNITED STATES PATENT OFFICE 1,947,414

MANUFACTURING COATING COMPOSITION

Adolf Heck, Kansas City, Mo., assignor to Cook Paint & Varnish Company, Kansas City, Mo., a corporation of Delaware No Drawing. Application January 6, 1931
Serial No. 506,980

17 Claims. (Cl. 134—26)

This invention relates to manufacturing coating compositions; and it comprises processes wherein oxidized drying oils such as those obtained from linseed oil, fish oil, perilla oil or soy bean oil are dissolved by heating in approximately equal amounts of phenols such as phenol itself, cresylic acid, cresol, naphthols, etc.; the mixtures being then condensed in the presence of an alkaline catalyst with an aldehyde such as formaldehyde, acetaldehyde, benzaldehyde, furfural, etc. with the aldehyde in less than mono-molecular proportion in respect to the phenol; and it also comprises the products of the said processes and the coating compositions resulting from dissolving the said products in various hydrocarbon oils such as xylol, toluol, etc.; all as more fully hereinafter set forth and as claimed.

In the prior art it has been suggested to produce various resins from phenolic substances, formaldehyde and drying oils. Drying oils are quite immiscible with the reaction products of phenols and formaldehyde. Certain processes have been suggested for reacting the formaldehyde on various mixtures but these processes have resulted in the production of liquid or rubber-like products, insoluble in the usual solvents such as acetone, acetic acid esters, etc. As a result of this insolubility these products have found but little use in coating compositions in the varnish industry.

In a prior German application No. B 126,206, I have described resins obtained by dissolving oxidized drying oils in phenols and condensing the solution with formaldehyde, the phenol and the formaldehyde being in approximately monomolecular proportions thereby obtaining products soluble in acetone, esters, etc. These products are not soluble in benzol and the like without an addition of an oxygen-containing solvent such as alcohol. The products of this prior invention are valuable in many relations and give excellent coating compositions but their utility is somewhat lessened by the fact that hydrocarbon solvents alone cannot be used. The solubility of these products has been found valuable in the production of coating compositions.

I have found, however, that a different type of product can be produced, soluble in hydrocarbon solvents alone, by the expedient of lessening the amount of formaldehyde used in the condensation. In the prior acknowledged invention the amount of formaldehyde was not less than one molecule for each molecule of a phenol in the composition; and it might be more. By lessening the proportion of formaldehyde so as to use less than a molecule for each molecule of phenol the products have a different type of solubility. Solubility in unmixed hydrocarbon solvents is a distinguishing characteristic of my new products.

Oxidized drying oils, as such, are insoluble in hydrocarbon oils, such as xylol and toluol, for example. The reaction products of formaldehyde and phenols are likewise insoluble in hydrocarbon solvents. And in my acknowledged prior process a mixture of oxidized drying oil and phenol likewise gave with formaldehyde a product not wholly soluble in hydrocarbon solvents. But in reacting upon a mixture of oxidized drying oil and phenol with formaldehyde, the latter being less than mono-molecular proportion to the phenol, a product is obtained wholly soluble in coal tar oils. Condensation is in the presence of an alkaline catalyst. Acid catalyst produce different products.

Phenol, homologues of phenol and phenol derivatives dissolve oxidized drying oils. "Linoxyn", made by far going oxidation of linseed oil with air, dissolves readily in an equal volume of melted phenol, or other liquid phenols such as cresols. Oxidized soy bean oil, perilla oil, etc. are also readily soluble in the phenols. These oxidized oils may be obtained in the usual manner by "air blowing" the fatty oil being what are frequently termed "blown oils". The sirupy solutions formed by dissolving these oxidized oils in the phenols are soluble in acetone, butyl acetate etc., but are of no technical utility. However, if these solutions are heated with an aldehyde in the presence of an alkaline catalyst such as ammonia or an alkali carbonate, various products are obtained, with degrees of solubility varying both with time of heating and with the proportions of ingredients. When these solutions are caused to react with formaldehyde, using at least one molecule of formaldehyde for each molecule of phenol, as in my prior invention, the condensation products formed are resinous and are soluble in various low boiling ketones, aldehydes, alcohols, ethers, esters, etc. These solutions tolerate large admixtures of the coal tar oils, such as benzol, toluol, and xylol. But the resins are not soluble in the tar oils alone. These solubilities are of the initial resinous material. After a long continued heating or a heating at high temperatures, the resins become insoluble in all solvents.

As stated hydrocarbon solubility is secured by reducing the amount of formaldehyde, conditions otherwise being the same. By the use of formaldehyde in the proportion of about half a molecule of formaldehyde for each molecule of phenol the low temperature condensation products secured are soluble in simple hydrocarbon oils such as xylol, toluol, etc. Advantageous products are produced when the molecular ratio of the aldehyde to the phenol is less than one but greater than one quarter. The hydrocarbon oil solutions can be used directly as varnishes. The objects coated therewith may be air dried to form a hard, elastic film which is slightly soluble in various solvents, or they may be heated to a temperature in the neighborhood of 140° to 160° C., being then converted into a lustrous, harder coating, insoluble in all solvents but still possessing a high elasticity.

In a typical embodiment of my present invention, I may take 100 parts linoxyn and dissolve it in 100 parts cresol by heating until complete solution takes place. To the brown solution there may be added 5 parts of aqueous ammonia (28 per cent by weight) and 40 parts commercial formaldehyde solution (30 per cent by weight). The mixture can then be heated at constant volume for about 1 hour (under a reflux) and then the water distilled off during an additional 2 hours of heating at temperatures from 90 to 100° C. The resulting sirupy brown product is soluble not only in low molecular alcohols, ketones, aldehydes, ethers and esters but also in hydrocarbon oils such as xylol, toluol, etc. The above product dissolved in about equal parts of xylol forms a highly desirable coating composition.

The ratio of the linoxyn to cresol in the above process can be varied to some extent. If the linoxyn is reduced below a certain point, however, the final products become brittle while an undue increase of linoxyn forms an inferior product of poor drying properties. In the above example the proportion of linoxyn to cresol can be varied between, say, 80:100 and 120:100 to give products which I find advantageous. The molecular ratio of formaldehyde to phenol can be varied considerably. All ratios materially less than 1:1 are adapted to secure the present objects and ratios as low as 0.25:1 and 0.5:1 are good. The higher the proportion of formaldehyde the greater the tendency to produce rubber-like products of less solubility in hydrocarbons. With high proportions the reaction is accelerated and the mixture is liable to heat up sufficiently to give insoluble products.

Other air oxidized drying oils than linoxyn can be employed in the above processes, such as fish oil, perilla oil or soy bean oil. These may be used in approximately the same proportion. Tung oil, however, does not produce a hydrocarbon soluble product. The cresol in the above example may be replaced by phenol itself, "cresylic acid", cyclohexanone, naphthols and other phenols. The ammonia may be replaced by sodium carbonate. The exact amount of catalyst used is not important.

The hydrocarbon solutions of the above processes make ideal varnishes for a large number of industrial applications. They may be used as vehicles in the production of pigmented paints and varnishes. Various fillers may be employed in these compositions.

The varnish coatings possess excellent dielectric and insulating properties and can be used for insulating wires and other electric equipment.

On account of the low viscosity of the hydrocarbon solutions, varnishes and paints may be made bodied with upwards of 50 per cent solids. These solutions produce a relatively thick coating of excellent "covering" quality. These bodied solutions can, of course, be diluted to give thinner coatings if desired.

An important characteristic of my compositions is their excellent coherence to metallic surfaces. Their flexibility enables coated metal to be stamped, punched or bent without damaging the coating. My varnish will even adhere to aluminum, this metal being one of the most difficult known to coat.

A solution of the described reaction product in about its own weight of xylol gives a quickly drying composition which is of the right viscosity and consistency to allow convenient application to tin plate and other metals with roller-type coating machines. Rubber faced rolls may be employed. The tin plate can be coated in the flat and afterwards stamped up or otherwise made into cans and containers. In making cans with a crimp seal, the composition flows under pressure enough to make an integral seal. On baking, the composition becomes hard, permanent, lustrous and insoluble in all solvents without forfeiting elasticity.

An admixture of sulfur in the composition adds somewhat to its plasticity and makes the composition slightly more advantageous otherwise, but the sulfur darkens the color.

In lieu of using phenols, their hydrogenation products such as cyclohexanone may be employed. These bodies are excellent solvents for oxidized drying oils and the solutions behave like the solutions in phenols. Commonly, however, with these solutions I employ highly alkaline catalysts. Caustic potash and caustic soda may be here used in lieu of ammonia or carbonated alkali.

The condensation products of my invention have a large number of other technical uses. White enamel paints may be produced by the addition of about 12 to 15 per cent of lithopone, titanium white or antimony white to the hydrocarbon oil solution described above. These paints give a lustrous coating. My resins are characterized by having an exceptionally low acid number. They consequently do not react with basic pigments such as zinc oxid, white lead, etc. While some of the synthetic resins, such as glyptals, for example, have acid numbers ranging as high as 50, the acid numbers of my products usually fall below 8. Other resins react with basic pigments such as zinc oxid and white lead, causing difficulty in mixing and producing insoluble and inferior products. Many of these prior art resins cannot be used with this type of pigment on this account.

A baking japan can be produced by incorporating about 3 per cent of carbon black. Copper wire enameled with my products can be used in miscellaneous electrical work, in winding transformers and the like. Laminated products can be made by saturating paper or cloth, drying, pressing and subsequently baking. The varnishes can also be used in the production of linoleum.

What I claim is:

1. As new compositions of matter having improved solubility, the reaction products of an oxidized drying oil with about equal amounts of a phenol and with an aldehyde in the presence of an alkaline catalyst, the molecular ratio of the aldehyde to the phenol being less than one and greater than one fourth, the said products being soluble in toluol, xylol and like hydrocarbon oils.

2. As new compositions of matter having improved solubility, the reaction products of an oxidized drying oil selected from a class consisting of linseed oil, fish oil, perilla oil and soy bean oil with about equal amounts of a phenol selected from a class consisting of phenol itself, cresol, cyclohexanone, naphthols and "cresylic acid", and with formaldehyde in the presence of an alkaline catalyst, the molecular ratio of the formaldehyde to the phenol being less than one and greater than one fourth, said reaction product being improved oxidized drying oil-phenol-aldehyde condensation products.

3. As new compositions of matter having improved solubility, the reaction products of the following reactants in about the proportions by weight of 80 to 120 parts of an oxidized drying oil, 100 parts of a phenol and 25 to 50 parts of an aldehyde, the reaction being in the presence of an alkaline catalyst and the products being soluble in toluol, xylol and like hydrocarbon oils.

4. As new compositions of matter capable of being applied to metal articles with production of coatings which can be stamped, punched, bent and mechanically worked without breaking the union between coating and metal, the reaction products of about equal amounts of linoxyn and cresol with formaldehyde, in the proportions of about half a molecule of formaldehyde to one molecule of cresol, the said reaction taking place in the presence of an alkaline catalyst, said reaction product being improved oxidized drying oil-phenol-aldehyde condensation products.

5. As a new varnish, the product of claim 1 dissolved in a light hydrocarbon oil obtainable from coal tar.

6. As a new varnish, the product of claim 2 dissolved in a light hydrocarbon oil obtainable from coal tar.

7. As a new varnish, the product of claim 3 dissolved in a light hydrocarbon oil obtainable from coal tar.

8. As a new varnish, the product of claim 4 dissolved in about an equal amount of a light hydrocarbon oil obtainable from coal tar.

9. As an improvement in the manufacture of resinous condensation products soluble in toluol, xylol and like light hydrocarbon oils, the process which comprises dissolving an oxidized drying oil in about equal parts of a phenol, adding an alkaline catalyst and approximately half a molecule of formaldehyde for each molecule of phenol in the mixture, heating the mixture at about 90° to 100° C. and removing the water.

10. In the manufacture of varnishes, the process of claim 9 followed by dissolving the resulting condensation product in a light hydrocarbon oil obtainable from coal tar.

11. As an improvement in the manufacture of improved resinous condensation products from oxidized drying oils by reacting said oils with both a phenol and an aldehyde, the said improved products being soluble in light hydrocarbons and useful in the manufacture of varnishes, the process which comprises dissolving 80 to 120 parts of an oxidized drying oil in about 100 parts of a phenol, adding an alkaline catalyst and 25 to 30 parts of an aldehyde, heating the mixture thus obtained under reflux at about 90 to 100° C. to effect reaction and condensation, then distilling off the water from the reaction mixture at an elevated temperature, and then recovering the resinous products thus obtained, said products being soluble in toluol, xylol and like light hydrocarbon solvents.

12. A new liquid coating composition suitable as a varnish, said composition comprising xylol containing dissolved therein an equal weight of the resinous product of claim 4, said liquid coating composition having a relatively low viscosity.

13. As an improved coating composition, a low viscosity hydrocarbon solution of a product of claim 4, bodied with more than 50 per cent of solids, said composition having excellent covering power and yielding a relatively thick coating by a single application to the article to be coated, the said composition being relatively free-flowing and capable of brushing.

14. As an improvement in the manufacture of improved resinous condensation products from oxidized drying oils, wherein the oxidized oil is reacted with both phenols and aldehydes, the said substances being reacted together to form products soluble in xylol, toluol and like coal tar hydrocarbon oils and of superior utility in making varnishes, the improvement which comprises reducing the molecular ratio of aldehyde and of phenol in the reaction mixture to a range between 1:1 and 0.25:1, whereby reaction products are obtained soluble in the stated solvents.

15. As an improved composition of matter, a condensation product of phenol, aldehyde and oxidized drying oil useful in making coating compositions, varnishes and the like, said reaction product being directly soluble in toluol alone, containing a substantial amount of oxidized drying oil in combination and containing combined aldehyde and combined phenol in a molecular ratio within the range 1:1 and 0.25:1.

16. As an improvement in the manufacture of phenol-aldehyde-oxidized drying oil condensation products having improved solubility, the process which comprises mixing about 100 parts of linoxyn in 100 parts of cresol, heating the mixture until the linoxyn dissolves in the cresol, adding to the brown solution thus obtained, 5 parts of aqueous ammonia and 40 parts of approximately 30 per cent aqueous formaldehyde solution, heating the mixture thus obtained under reflux until reaction is effected, distilling off the water from the reaction product at between 90 to 100° C. and recovering the substantially water-free, syrupy, brown resinous condensation product.

17. As an improved phenol-aldehyde-oxidized drying oil condensation product, substantially water-free, a syrupy brown phenol-formaldehyde-linoxyn reaction product, said reaction product being soluble in low molecular alcohols, ketones, aldehydes, ethers and esters, being also directly soluble in xylol, toluol and like hydrocarbon oils obtainable from coal tar and being capable of dissolving in an equal weight of xylol.

ADOLF HECK.